United States Patent [19]

Mukai et al.

[11] Patent Number: 4,806,003
[45] Date of Patent: Feb. 21, 1989

[54] INVERTED-TELEPHOTO TYPE WIDE ANGLE LENS SYSTEM

[75] Inventors: Hiromu Mukai, Kawachinagano; Hisashi Tokumaru, Osaka, both of Japan

[73] Assignee: Minolta Camera Kabushiki Kaisha, Osaka, Japan

[21] Appl. No.: 90,680

[22] Filed: Aug. 28, 1987

[30] Foreign Application Priority Data

Sep. 1, 1986 [JP] Japan ................... 61-205507

[51] Int. Cl.$^4$ .................. G02B 15/15; G02B 13/04
[52] U.S. Cl. .................................... 350/459; 350/458
[58] Field of Search .............. 350/458, 459, 461, 462, 350/432

[56] References Cited

U.S. PATENT DOCUMENTS

| | | | |
|---|---|---|---|
| 3,992,085 | 11/1976 | Momiyama | 350/189 |
| 4,136,931 | 1/1979 | Glatzel | 350/189 |
| 4,449,793 | 5/1984 | Nakamura et al. | 350/458 |

FOREIGN PATENT DOCUMENTS 58-5 1/1983 Japan .
58-58514 4/1983 Japan .

*Primary Examiner*—Bruce Y. Arnold
*Assistant Examiner*—Terry S. Callaghan
*Attorney, Agent, or Firm*—Price, Gess & Ubell

[57] ABSTRACT

An inverted-telephoto type wide angle lens system is provided which comprises from the object side to the image side: a first lens group of a negative refractive power; a second lens group of a positive refractive power; an aperture diaphragm; and a third lens group of a positive refractive power; wherein the second and third lens groups are shiftable to the object side along the optical axis of the lens system at different speeds from one another in a focusing operation to a closer object while the first lens group is stationary on the optical axis in the focusing operation.

10 Claims, 5 Drawing Sheets

Spherical aberration
Sine condition

Astigmatism

Distortion (%)

Spherical aberration
Sine condition

Astigmatism

Distortion (%)

Spherical aberration
Sine condition

Astigmatism

Distortion (%)

Spherical aberration
Sine condition

Astigmatism

Distortion (%)

Spherical aberration
Sine condition

Astigmatism

Distortion (%)

INVERTED-TELEPHOTO TYPE WIDE ANGLE LENS SYSTEM

BACKGROUND OF THE INVENTION

1. Field of the Invention

The present invention relates to an inverted-telephoto type wide angle lens system having a front lens group of a negative refractive power and a rear lens group of a positive refractive power, and more particularly to a focusing thereof.

2. Description of the Prior Art

A wide angle lens used for an interchangeable lens of single lens reflex camera system requires a relatively long back focal length over a predetermined length, in order not to prevent a main mirror of the single lens reflex camera from moving. Therefore, a lens system of an inverted-telephoto type, in which a negative refractive power is located at the object side, is generally applied to the wide angle lens. In such lens system, the entire lens system is normally shiftable in the focusing operation.

However, since such a lens system does not have a symmetrical construction with respect to an aperture diaphragm, it is difficult to maintain a high image reproduction performance when the lens system is focused to a closer object. The reason is that the image is formed on a middle and/or periphery of the image plane. Especially, in the closest focusing condition, the astigmatism will become an over-correcting condition and the spherical aberration will become an under-correcting condition.

To improve the performance a so-called "floating method" has been proposed in which a variable air space is provided in the lens system and the whole of the lens system is shifted while changing the distance of the variable air space in the focusing operation. However, the mechanical construction of the lens becomes more complex if the "floating method" is applied, since a mechanical construction for changing the variable air space in accordance with the shifting of the whole lens system is necessary in addition to another mechanical construction for shifting the whole lens system. Additionally, the whole weight of the lens is increased because of the above mechanical constructions and a plurality of lens barrels. Furthermore, if the focusing operation is performed by a lens driving mechanism of an automatic focusing device provided in the camera, the lens shifting speed will be lowered and the mechanical durability will be deteriorated.

SUMMARY OF THE INVENTION

An object of the present invention is to provide an inverted-telephoto type wide angle lens system in which a sufficient close focusing distance can be achieved without complex mechanical construction and while maintaining a good image forming performance.

The other object of the present invention is to provide an inverted-telephoto type wide angle lens system in which the field curvature and the coma aberration, which will be deteriorated if a large aperture ratio such as F/1.4 is required, can be corrected well.

A further object of the present invention is to provide an inverter-telephoto type wide angle lens system suitable for an automatic focusing device.

To achieve the above-described objects, the present invention provides an inverted-telephoto type wide angle lens system, comprising from the object side to the image side: a first lens group of a negative refractive power; a second lens group of a positive refractive power; an aperture diaphragm; and a third lens group of a positive refractive power; wherein the second and third lens groups are shiftable to the object side along the optical axis of the lens system at different speeds from one another in a focusing operation to a closer object, while the first lens group is stationary on the optical axis in the focusing operation.

DETAILED DESCRIPTION OF THE PREFERRED EMBODIMENTS

Figure 1:
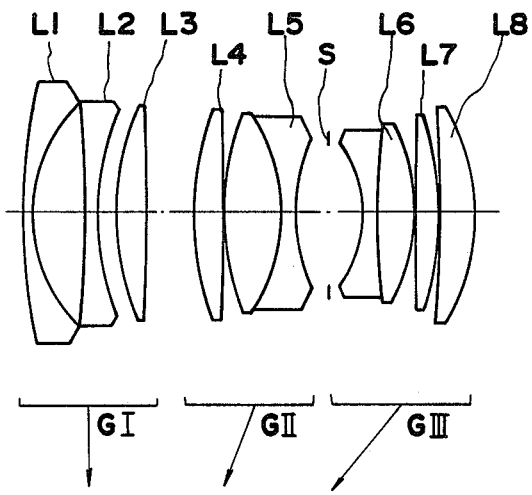
FIG. 1 represents a cross sectional view of a first embodiment according to the present invention in an infinity focusing condition and the lens group movement in the focusing operation to a closer object.
Figure 2A:
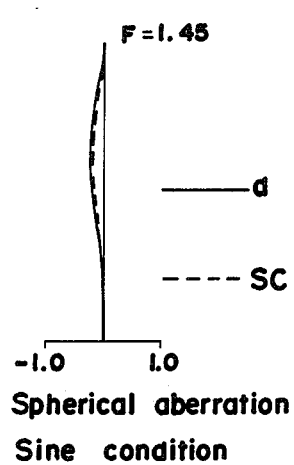
FIGS. 2a to 2c represent the aberration curves of the first embodiment in the infinity focusing condition.
Figure 2B:
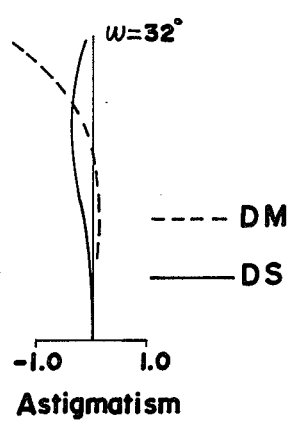
Figure 2C:
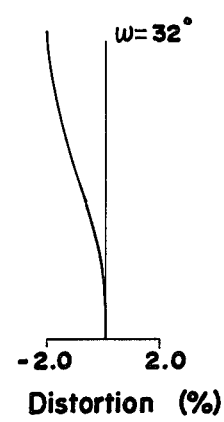
Figure 3A:
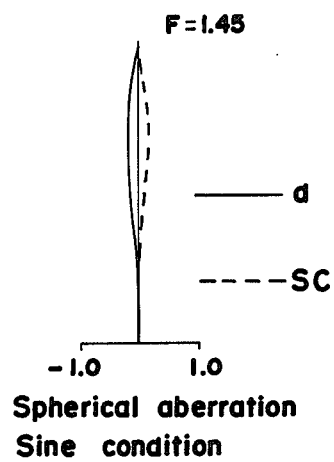
FIGS. 3a to 3c represent the aberration curves of the first embodiment when the lens groups are shifted at a speed ratio of R=1.15 to the focusing condition of $\beta = -0.175$.
Figure 3B:
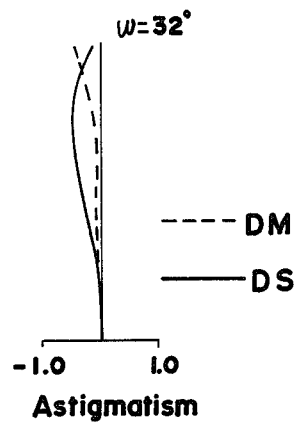
Figure 3C:
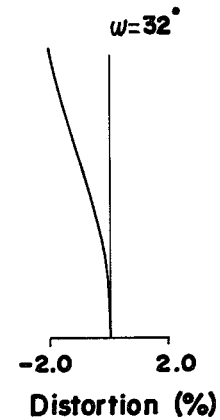
Figure 4A:
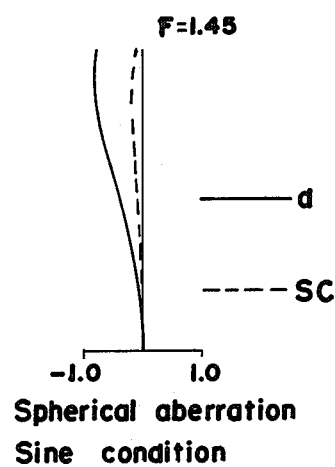
FIGS. 4a to 4c represent the aberration curves when the whole of the lens system of the first embodiment is shifted integrally to the focusing condition of $\beta = -0.175$ for comparison.
Figure 4B:
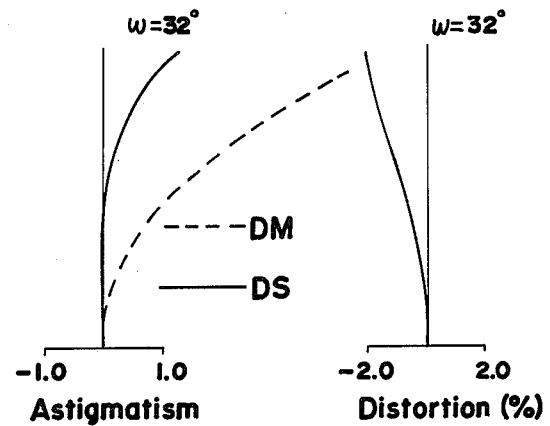
Figure 4C:
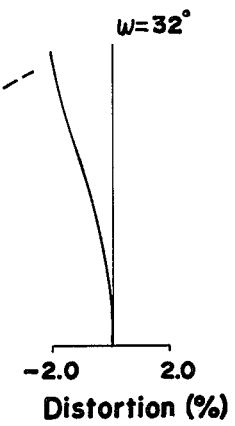

The following description is provided to enable any person skilled in the optical and camera field to make and use the invention and sets forth the best modes contemplated by the inventors for carrying out their invention. Various modifications, however, will remain readily apparent to those skilled in the art, since the generic principles of the present invention have been defined herein specifically to provide a relatively economical and easily manufactured compact wide angle lens system. The deviation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm SLR camera.

In the drawings, schematic cross sectional views disclose the position of the lens groups and the lens elements in the infinity focusing condition with arrows below the lens groups representing the directions of their movements for focusing toward the closer object. Due to the number of lens elements involved, it was not deemed appropriate to include an individual designation of the radii of curvature and axial distances for each lens element and air space. These values, however, are provided in the accompanying tables set forth herein, and the schematic cross sectional views of the respective embodiments follow the normal conventions of an object at the left-hand side of the drawing and the image plane at the right-hand side.

Figure 5:
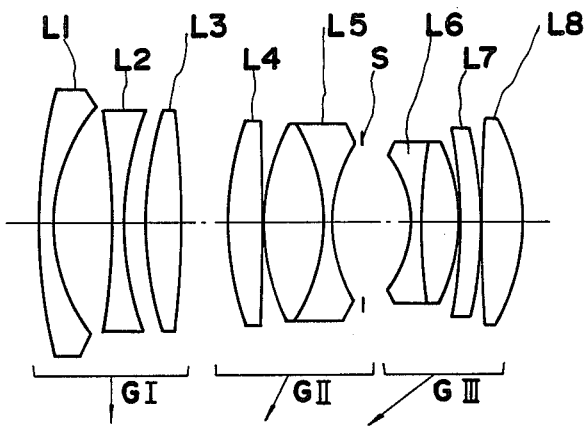
FIG. 5 represents a cross sectional view of a second embodiment according to the present invention in an infinity focusing condition and the lens group movement in the focusing operation to a closer object.
Figure 6A:
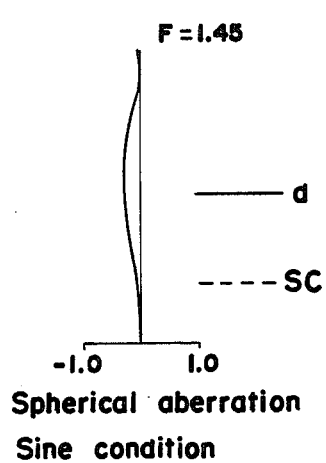
FIGS. 6a to 6c represent the aberration curves of the second embodiment in the infinity focusing condition.
Figure 6B:
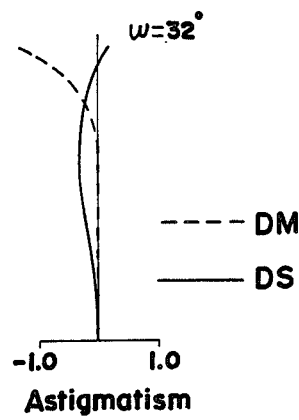
Figure 6C:
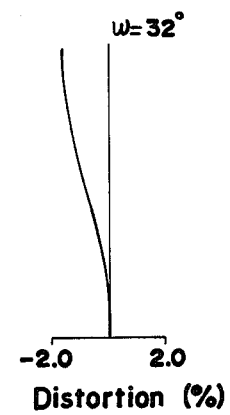
Figure 7A:
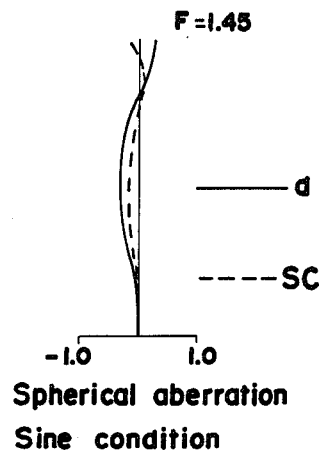
FIGS. 7a to 7c represent the aberration curves of the second embodiment when the lens groups are shifted at a speed ratio of R=1.15 to the focusing condition of $\beta = -0.175$.
Figure 7B:
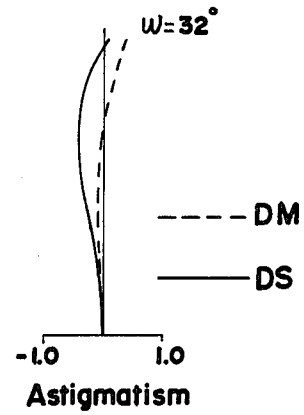
Figure 7C:
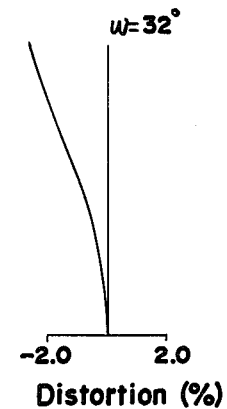
Figure 8:
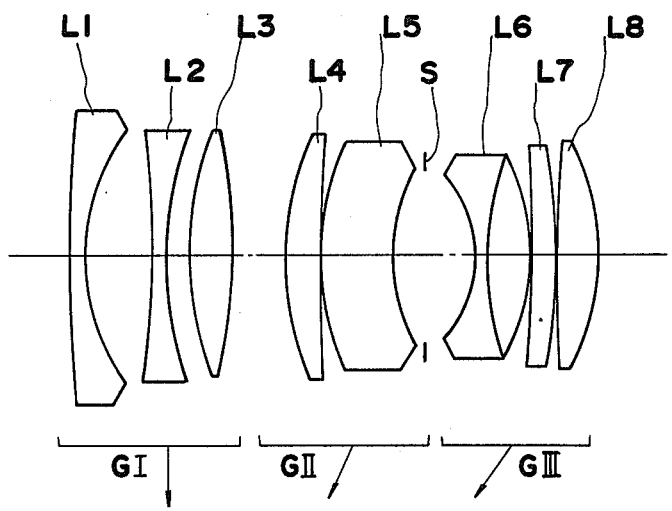
FIG. 8 represents a cross sectional view of a third embodiment according to the present invention in an infinity focusing condition and the lens group movement in the focusing operation to a closer object.
Figure 9A:
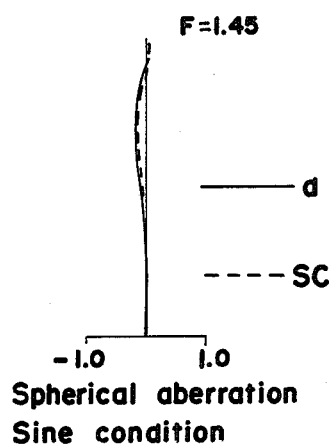
FIGS. 9a to 9c represent the aberration curves of the third embodiment in the infinity focusing condition.
Figure 9B:
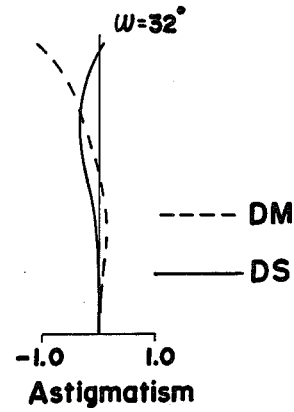
Figure 9C:
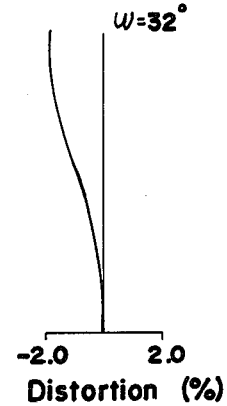
Figure 10A:
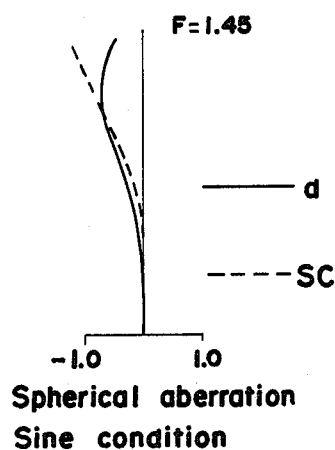
FIGS. 10a to 10c represent the aberration curves of the third embodiment when the lens groups are shifted at a speed ratio of R=1.15 to the focusing condition of $\beta = -0.175$.
Figure 10B:
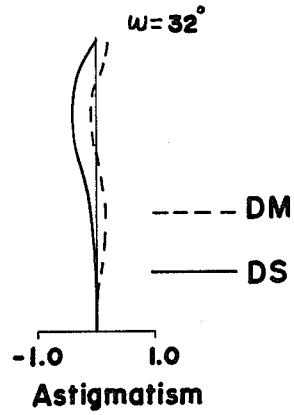
Figure 10C:
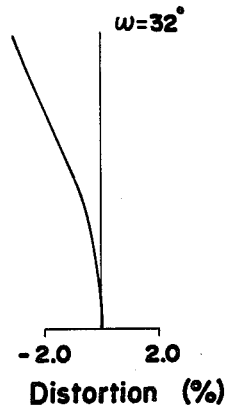

As disclosed in FIGS. 1, 5 and 8, the present invention provides an inverted-telephoto type wide angle lens system, comprising from the object side to the image side: a first lens group ($G_I$) of a negative refractive power; a second lens group ($G_{II}$) of a positive refractive power; an aperture diaphragm (S); and a third lens group ($G_{III}$) of a positive refractive power; wherein the second and third lens groups are shiftable to the object side along the optical axis of the lens system at different speeds from one another in a focusing operation to a closer object, while the first lens group ($G_I$) is stationary on the optical axis in the focusing operation. In the present invention, since the shifting speed of the third lens group ($G_{III}$) is greater than that of the second lens group ($G_{II}$), the axial distance between the second and third lens groups is decreased in accordance with the focusing operation to the closer object. It is effective for well correcting the spherical abberation and the astigmatism in the relatively closer focusing condition. Additionally, since the axial distance between the first and second lens groups is also decreased in accordance with the focusing operation to the closer object, the astigmatism and the field curvature can be corrected well in the relatively closer focusing condition.

According to the present invention, it is desirable to fulfill the following conditions;

$$1.0 < R < 1.5 \quad (1)$$

$$0.12 < L/f < 0.38 \quad (2)$$

wherein; R represents a ratio of shifting speed between the second and third lens groups in the focusing operation; L represents an axial distance between the first and second lens groups in an infinity focusing condition; and f represents a compound focal length of the whole lens system.

If the lower limit of condition (1) is violated, it becomes difficult to well correct the spherical aberration and the astigmatism since the axial distance between the second and third lens groups is not decreased in accordance with the focusing operation to the relatively closer object. On the other hand, if the upper limit of condition (1) is violated, the third lens group ($G_{III}$) is shifted at a speed over 1.5 times of that of the second lens group ($G_{II}$) in the focusing operation, it can cause various aberrations to become overcorrected and the compactness of the lens system is deteriorated.

Condition (2) defines the shifting amount of the second lens group ($G_{II}$) in the focusing operation. Assuming that the magnification of the lens system in the closest focusing condition is $\beta$, the shifting amount of the lens system for obtaining the magnification $\beta$ is represented by $f\beta$, if the entire lens system is shifted in the focusing operation. Here, if the focusing operation is performed by the shifting of the second and third lens groups as defined in the present invention, the shifting amount of the second and third lens groups is $1/\{1-(\beta_2\beta_3)^2\}$ times the shifting amount of the whole lens system, wherein $\beta_2$ represents a mgnification of the second lens group ($G_{II}$) and $\beta_3$ represents a magnification of the third lens group ($G_{III}$). Namely, the shifting amount L of the second and third lens groups according to the present invention is represented by;

$$L = (f\beta)/\{1-(\beta_2\beta_3)^2\} \quad (A)$$

Here, the following parameter L/f is introduced in order to define the shifting amount L;

$$L/f = \beta/\{1-(\beta_2\beta_3)^2\} \quad (B)$$

In a wide angle lens system such as the lens system according to the present invention, the magnification can not be increased excessively, since the focal length of the lens system is comparatively short. Therefore, the magnification in the closest focusing condition is controlled within a range of about 0.1 to 0.25. Namely, the following condition is limited;

$$0.1 < \beta < 0.25 \quad (C)$$

On the other hand, if $1/\{1-(\beta_2\beta_3)^2\}$ becomes larger than 1.5, both the magnification $\beta_2$ of the second lens group ($G_{II}$) and the magnification $\beta_3$ of the third lens group ($G_{III}$) becomes too large. This causes the refractive power of both of the second and third lens group to become too strong. Therefore, since the change of both the spherical aberration and the field curvature due to the focusing operation can become very large, the proper correction thereof becomes difficult. Additionally, the shifting amount of the second and third lens groups becomes very large so that the compactness of the whole lens system is deteriorated.

On the other hand, if $1/\{1-(\beta_2\beta_3)^2\}$ becomes smaller than 1.2, both the magnification $\beta_2$ of the second lens group ($G_{II}$) and the magnification $\beta_3$ of the third lens group ($G_{III}$) becomes too small. This causes that the refractive power of both of the second and third lens groups to become too weak. Therefore, it becomes difficult to keep a predetermined back focal length necessary for an interchangeable lens system in a single lens reflex camera system. Thus, the effective range of $1/\{1-(\beta_2\beta_3)^2\}$ is defined as follows;

$$1.2 < 1/\{1-(\beta_2\beta_3)^2\} < 1.5 \quad (D)$$

Here, when the above conditions (C) and (D) are applied to the equation (B), the following condition is obtained;

$$0.12 < L/f < 0.38$$

This condition is identical to the condition (2).

According to the present invention, it is desirable to fulfill the following conditions in addition to the above-described conditions (1) and (2);

$$0.1 < f/-f_1 < 0.25 \quad (3)$$

$$1.5 < -f_1/f_2 < 3.5 \quad (4)$$

$$2.1 < -f_1/f_3 < 5.0 \quad (5)$$

wherein; $f_1$ represents a focal length of the first lens group; $f_2$ represents a focal length of the second lens group; and $f_3$ represents a focal length of the third lens group.

Condition (3) defines the refractive power of the first lens group ($G_I$). If the lower limit of condition (3) is violated, it becomes difficult to keep a sufficient back focal length which is almost equal to the focal length f of the whole lens system. Contrary, if the upper limit of condition (3) is violated, since the negative refractive power of the first lens group ($G_I$) becomes too strong, it is necessary to shorten the focal lengths of the second and third lens groups in order to obtain a predetermined focal length f. However, such power arrangement deteriorates the symmetry of power balance between a negative front lens group and a positive rear lens group in the inverted telephoto type lens system. The reason is that a light bundle converged by the first lens group ($G_I$) is excessively diverged by the second and third lens groups. It causes the deterioration of the field curvature and the increased of te astigmatism in the close focusing condition.

Condition (4) defines the power balance between the first and second lens groups. If the upper limit of condition (4) is violated by increasing the positive refractive power of the second lens group ($G_{II}$), a light bundle diverged by the first lens group ($G_I$) is excessively converged by the second lens group ($G_{II}$), resulting in an increase in change of the spherical aberration and in increasing the influence of manufacturing errors on the optical performance. On the other hand, if the lower limit of condition (4) is violated by decreasing the positive refractive power of the second lens group ($G_{II}$), it becomes necessary to form an image on the predetermined focal plane by excessively converging, by the third lens group ($G_{III}$), the light bundle after having been diverged by the first lens group ($G_I$). Therefore, various aberrations should be corrected by almost only the third lens group ($G_{III}$), resulting in the deterioration of the spherical aberration, the astigmatism, and the distortion.

Condition (5) defines the power balance between the first and third lens groups. If the lower limit of condition (5) is violated by decreasing the positive refractive power of the third lens group ($G_{III}$), it becomes necessary to increase the positive refractive power of the second lens group ($G_{II}$) in order to satisfy the predetermined focal length f. However, if the positive refractive power of the second lens group ($G_{II}$) is undesirably increased, the light bundle diverged by the first lens group ($G_I$) is excessively converged by the second lens group ($G_{II}$), resulting in the undesirable deterioration of the spherical aberration. On the other hand, if the upper limit of condition (5) is violated by increasing the positive refractive power of the third lens group ($G_{III}$), the spherical aberration, the astigmatism, and the distortion are deteriorated undesirably.

In the present invention, it is desirable that the first lens group ($G_I$) of the negative refractive power consists of, from the object side, a first lens component ($L_1$) of a negative refractive power, a second lens component ($L_2$) of a negative refractive power, and a third lens component ($L_3$) of a positive refractive power. Here, since the first lens group ($G_I$) located at the object side in the lens system has the negative refractive power, the sufficient back focal length, which is almost equal to the focal length f of the whole lens system, can be maintained. Additionally, since both of the first and second lens components located at the object side in the first lens group ($G_I$) have negative refractive power, the distortion and the spherical aberration of high degree can be controlled within a predetermined range. Furthermore, the lateral chromatic aberration can be decreased by the third lens component ($L_3$) of the positive refractive power.

In the present invention, it is desirable that the second lens group ($G_{II}$) of the positive refractive power consists of, from the object side, a fourth lens component ($L_4$) of a positive refractive power, a fifth lens component ($L_5$) of a negative refractive power containing a single lens element or compound lens element. Since the total positive refractive power applied to the second lens group ($G_{II}$) can be separated by the positive refractive power of the fourth lens component ($L_4$) and the negative refractive power of the fifth lens component ($L_5$), the coma aberration can be corrected well.

Furthermore, it is desirable that the third lens group ($G_{III}$) of the positive refractive power, located at the image side of the aperture diaphragm (S), consists of, from the object side, a sixth lens component ($L_6$) of a negative compound lens element, a seventh lens component ($L_7$) of a positive refractive power, and a eighth lens component ($L_8$) of a positive refractive power. Additionally, it is desirable that the sixth lens component ($L_6$) consists of a compound lens element of a negative lens element made of a glass material of high color dispersion and a positive lens element made of a glass material of low color dispersion, in order to correct the longitudinal chromatic aberration.

Furthermore, if an aspheric surface can be introduced to any lens surfaces excepting the sixth lens component ($L_6$), the coma flare in the meridional and sagittal directions, which will be increased in accordance with increasing the aperture ratio, can be decreased. Referring to FIG. 1, the aperture stop, S, moves with the third lens group $G_{III}$. In the other embodiments shown in FIGS. 5 and 8, the aperture stop, S, moves with the second lens group $G_{II}$.

The following tables 1 to 3 disclose, respectively, the first through third embodiments of the present invention. In the Tables, f equals to the focal length, $2\omega$ equals to the field angle, $F_{NO}$ equals the F-number, r is the radius of curvature with respective sub number indicating the surfaces from the object to image side along the optical axis, d represents the axial distance and includes both air spaces and the actual thickness of the lens elements along the optical axis, N equals the refractive index and again, the sub numbers refer to the particular optical element from the object to the image side, and finally, $\nu$ equals the Abbe number and the sub numbers refer to the specific lens elements from the object to the image side. The asterisk (*) represents the aspheric surface, and its coefficients are shown at the bottom of respective Tables.

Here, the aspheric coefficients $A_1, A_2, \text{---}$ are defined by the following equation;

$$X = A_0 Y^2 / \{1 + (1 - A_0^2 Y^2)^{\frac{1}{2}}\} + \sum_{i=1}^{n} A_i Y^i$$

wherein $A_0$ represents the paraxial radius of curvature of the basic spheric surface, X represents the coordinate along the optical surface measured from the top of the basic surface, and Y represents the coordinate perpendicular to the optical axis measured from the optical axis.

TABLE 1

[Embodiment 1]

$f = 100$  $2\omega = 64°$  $F_{NO} = 1.45$

| | Radius of curvature | | Axial distance | | Refractive index (Nd) | | Abbe number ($\nu d$) |
|---|---|---|---|---|---|---|---|
| $r_1$ | 319.422 | | | | | | |
| | | $d_1$ | 5.364 | $N_1$ | 1.56883 | $\nu_1$ | 56.04 |
| $r_2$ | 80.323 | | | | | | |
| | | $d_2$ | 24.047 | | | | |
| $r_3$ | −840.794 | | | | | | |
| | | $d_3$ | 5.634 | $N_2$ | 1.56883 | $\nu_2$ | 56.04 |
| $r_4$ | 131.189 | | | | | | |
| | | $d_4$ | 9.299 | | | | |
| $r_5$ | 140.886 | | | | | | |
| | | $d_5$ | 14.085 | $N_3$ | 1.81100 | $\nu_3$ | 44.86 |
| $r_6$ | −1270.195 | | | | | | |
| | | $d_6$ | 22.535 | | | | |
| $r_7$ | 148.309 | | | | | | |
| | | $d_7$ | 15.775 | $N_4$ | 1.78100 | $\nu_4$ | 44.55 |
| $r_8$ | −808.126 | | | | | | |
| | | $d_8$ | 0.555 | | | | |
| $r_9$ | 149.979 | | | | | | |
| | | $d_9$ | 28.169 | $N_5$ | 1.78850 | $\nu_5$ | 45.68 |
| $r_{10}$ | −78.957 | | | | | | |
| | | $d_{10}$ | 5.634 | $N_6$ | 1.74000 | $\nu_6$ | 37.53 |
| $r_{11}$ | 90.835 | | | | | | |
| | | $d_{11}$ | 33.442 | | | | |
| $r_{12}$ | −53.609 | | | | | | |
| | | $d_{12}$ | 5.634 | $N_7$ | 1.75520 | $\nu_7$ | 27.51 |
| $r_{13}$ | 338.641 | | | | | | |
| | | $d_{13}$ | 18.310 | $N_8$ | 1.72000 | $\nu_8$ | 52.14 |
| $r_{14}$ | −105.234 | | | | | | |
| | | $d_{14}$ | 0.845 | | | | |
| $r_{15}$ | −7252.156 | | | | | | |
| | | $d_{15}$ | 10.704 | $N_9$ | 1.72000 | $\nu_9$ | 52.14 |
| $r_{16}$ | −133.792 | | | | | | |
| | | $d_{16}$ | 0.845 | | | | |
| $r_{17}$* | −507.797 | | | | | | |
| | | $d_{17}$ | 16.901 | $N_{10}$ | 1.72000 | $\nu_{10}$ | 52.14 |
| $r_{18}$ | −97.502 | | | | | | |

$\Sigma d = 218.049$

Aspheric coefficients ($r_{17}$):
$A_4 = 0.32795 \times 10^{-6}$   $A_6 = 0.10126 \times 10^{-10}$
$A_8 = 0.13405 \times 10^{-14}$
$R = 1.15$   $L/f = 0.23$
$f/-f_1 = 0.299$   $-f_1/f_2 = 1.887$   $-f_1/f_3 = 2.672$

TABLE 2

[Embodiment 2]

$f = 100$  $2\omega = 64°$  $F_{NO} = 1.45$

| | Radius of curvature | | Axial distance | | Refractive index (Nd) | | Abbe number ($\nu d$) |
|---|---|---|---|---|---|---|---|
| $r_1$ | 239.866 | | | | | | |
| | | $d_1$ | 5.364 | $N_1$ | 1.62280 | $\nu_1$ | 56.98 |
| $r_2$ | 81.017 | | | | | | |
| | | $d_2$ | 28.732 | | | | |
| $r_3$ | −286.259 | | | | | | |
| | | $d_3$ | 5.634 | $N_2$ | 1.61720 | $\nu_2$ | 54.00 |
| $r_4$ | 155.205 | | | | | | |
| | | $d_4$ | 9.859 | | | | |
| $r_5$ | 155.466 | | | | | | |
| | | $d_5$ | 18.310 | $N_3$ | 1.78850 | $\nu_3$ | 45.68 |
| $r_6$ | −380.593 | | | | | | |
| | | $d_6$ | 22.535 | | | | |
| $r_7$ | 177.527 | | | | | | |
| | | $d_7$ | 16.620 | $N_4$ | 1.78850 | $\nu_4$ | 45.68 |
| $r_8$ | −966.828 | | | | | | |
| | | $d_8$ | 0.563 | | | | |
| $r_9$ | 114.698 | | | | | | |
| | | $d_9$ | 28.169 | $N_5$ | 1.76500 | $\nu_5$ | 46.25 |
| $r_{10}$ | −90.911 | | | | | | |
| | | $d_{10}$ | 5.635 | $N_6$ | 1.72342 | $\nu_6$ | 37.88 |
| $r_{11}$ | 83.782 | | | | | | |
| | | $d_{11}$ | 33.803 | | | | |
| $r_{12}$ | −57.194 | | | | | | |
| | | $d_{12}$ | 5.634 | $N_7$ | 1.75520 | $\nu_7$ | 27.51 |
| $r_{13}$ | 238.447 | | | | | | |
| | | $d_{13}$ | 18.310 | $N_8$ | 1.72000 | $\nu_8$ | 50.31 |
| $r_{14}$ | −97.321 | | | | | | |
| | | $d_{14}$ | 0.563 | | | | |
| $r_{15}$ | −246.649 | | | | | | |
| | | $d_{15}$ | 9.859 | $N_9$ | 1.72000 | $\nu_9$ | 50.31 |
| $r_{16}$* | −159.563 | | | | | | |
| | | $d_{16}$ | 0.563 | | | | |
| $r_{17}$ | 1154.173 | | | | | | |
| | | $d_{17}$ | 19.155 | $N_{10}$ | 1.72000 | $\nu_{10}$ | 50.31 |
| $r_{18}$ | −97.584 | | | | | | |

$\Sigma d = 229.577$

Aspheric coefficients ($r_{16}$):
$A_4 = 0.29251 \times 10^{-6}$   $A_6 = 0.36733 \times 10^{-10}$
$A_8 = -0.46789 \times 10^{-14}$
$R = 1.43$   $L/f = 0.23$
$f/-f_1 = 0.282$   $-f_1/f_2 = 3.000$   $-f_1/f_3 = 2.662$

TABLE 3

[Embodiment 3]

$f = 100$  $2\omega = 64°$  $F_{NO} = 1.45$

| | Radius of curvature | | Axial distance | | Refractive index (Nd) | | Abbe number ($\nu d$) |
|---|---|---|---|---|---|---|---|
| $r_1$ | 565.058 | | | | | | |
| | | $d_1$ | 5.634 | $N_1$ | 1.61762 | $\nu_1$ | 52.70 |
| $r_2$ | 85.879 | | | | | | |
| | | $d_2$ | 29.577 | | | | |
| $r_3$ | −392.509 | | | | | | |
| | | $d_3$ | 5.634 | $N_2$ | 1.63350 | $\nu_2$ | 51.93 |
| $r_4$ | 153.619 | | | | | | |
| | | $d_4$ | 9.589 | | | | |
| $r_5$ | 141.891 | | | | | | |
| | | $d_5$ | 17.746 | $N_3$ | 1.74250 | $\nu_3$ | 52.51 |
| $r_6$ | −232.814 | | | | | | |
| | | $d_6$ | 22.535 | | | | |
| $r_7$ | 123.233 | | | | | | |
| | | $d_7$ | 15.775 | $N_4$ | 1.75450 | $\nu_4$ | 51.57 |
| $r_8$ | 1038.184 | | | | | | |
| | | $d_8$ | 0.563 | | | | |
| $r_9$ | 128.283 | | | | | | |
| | | $d_9$ | 30.986 | $N_5$ | 1.76200 | $\nu_5$ | 40.36 |
| $r_{10}$ | 86.648 | | | | | | |
| | | $d_{10}$ | 33.803 | | | | |
| $r_{11}$ | −56.441 | | | | | | |
| | | $d_{11}$ | 5.634 | $N_6$ | 1.75520 | $\nu_6$ | 27.51 |
| $r_{12}$ | 137.167 | | | | | | |
| | | $d_{12}$ | 18.310 | $N_7$ | 1.72000 | $\nu_7$ | 50.31 |
| $r_{13}$ | −92.695 | | | | | | |
| | | $d_{13}$ | 0.563 | | | | |
| $r_{14}$ | −408.951 | | | | | | |
| | | $d_{14}$ | 9.859 | $N_8$ | 1.71300 | $\nu_8$ | 53.93 |
| $r_{15}$* | −200.031 | | | | | | |
| | | $d_{15}$ | 0.563 | | | | |
| $r_{16}$ | 1017.179 | | | | | | |
| | | $d_{16}$ | 17.746 | $N_9$ | 1.71300 | $\nu_9$ | 53.93 |
| $r_{17}$ | −101.397 | | | | | | |

$\Sigma d = 224.789$

Aspheric coefficients ($r_{15}$):
$A_3 = 0.10748 \times 10^{-5}$   $A_4 = 0.24735 \times 10^{-6}$
$A_6 = 0.32920 \times 10^{-10}$   $A_8 = -0.37519 \times 10^{-14}$
$R = 1.25$   $L/f = 0.23$
$f/-f_1 = 0.153$   $-f_1/f_2 = 2.907$   $-f_1/f_3 = 4.917$ As can be readily appreciated, it is possible to deviate from the above embodiments of the present invention and, as will be readily understood by those skilled in the optical art, the invention is capable of many modifications and improvements within the scope and spirit thereof. Accordingly, it will be understood that the invention is not to be limited by these specific embodiments, but only by the scope and spirit of the appended claims.

What is claimed is:

1. An inverted-telephoto type wide angle lens system, comprising from the object side to the image side:
   a first lens group of a negative refractive power;
   a second lens group of a positive refractive power; and
   a third lens group of a positive refractive power;
   wherein the second and third lens groups are shiftable to the object side along the optical axis of the lens system at different speeds from one another in a focusing operation to a closer object, while the first lens group is stationary on the optical axis in the focusing operation and wherein the lens system fulfills the following conditions:

$$1.0 < R < 1.5$$

wherein:
   R represents a ratio of shifting speed beyond the second and third lens groups in the focusing operation.

2. An inverted-telephoto type wide angle lens system as claimed in claim 1, wherein the lens system fulfills the following conditions;

$$0.12 < L/f < 0.38$$

wherein;
   L represents an axial distance between the first and second lens groups in infinity focusing condition; and
   f represents a compound focal length of the whole lens system.

3. An inverted-telephoto type wide angle lens system as claimed in claim 1, wherein the lens system fulfills the following conditions;

$$0.1 < f/-f_1 < 0.35$$
   $$1.5 < -f_1/f_2 < 3.5$$
   $$2.1 < -f_1/f_3 < 5.0$$

wherein;
   $f_1$ represents a focal length of the first lens group;
   $f_2$ represents a focal length of the second lens group; and
   $f_3$ represents a focal length of the third lens group.

4. An inverted-telephoto type wide angle lens system as claimed in claim 1, wherein the first lens group consists of, from the object side, a first lens component of a negative refractive power, a second lens component of a negative refractive power, and a third lens component of a positive refractive power.

5. An inverted-telephoto type wide angle lens system as claimed in claim 4, wherein the second lens group consists of, from the object side, a fouth lens component of a positive refractive power, a fifth lens component of a negative refractive power consisting of either a single lens element or compound lens unit.

6. An inverted-telephoto type wide angle lens system as claimed in claim 5, wherein the third lens group consists of, from the object side, a sixth lens component of a negative compound lens element, a seventh lens component of a positive refractive power, and a eighth lens component of a positive refractive power.

7. An inverted-telephoto type wide angle lens system according to the following design parameters:

| | f = 100 Radius of curvature | | 2ω = 64° Axial distance | | $F_{NO}$ = 1.45 Refractive index (Nd) | | Abbe number (νd) |
|---|---|---|---|---|---|---|---|
| $r_1$ | 319.422 | | | | | | |
| | | $d_1$ | 5.364 | $N_1$ | 1.56883 | $\nu_1$ | 56.04 |
| $r_2$ | 80.323 | | | | | | |
| | | $d_2$ | 24.047 | | | | |
| $r_3$ | −840.794 | | | | | | |
| | | $d_3$ | 5.634 | $N_2$ | 1.56883 | $\nu_2$ | 56.04 |
| $r_4$ | 131.189 | | | | | | |
| | | $d_4$ | 9.299 | | | | |
| $r_5$ | 140.886 | | | | | | |
| | | $d_5$ | 14.085 | $N_3$ | 1.81100 | $\nu_3$ | 44.86 |
| $r_6$ | −1270.195 | | | | | | |
| | | $d_6$ | 22.535 | | | | |
| $r_7$ | 148.309 | | | | | | |
| | | $d_7$ | 15.775 | $N_4$ | 1.78100 | $\nu_4$ | 44.55 |
| $r_8$ | −808.126 | | | | | | |
| | | $d_8$ | 0.555 | | | | |
| $r_9$ | 149.979 | | | | | | |
| | | $d_9$ | 28.169 | $N_5$ | 1.78850 | $\nu_5$ | 45.68 |
| $r_{10}$ | −78.957 | | | | | | |
| | | $d_{10}$ | 5.634 | $N_6$ | 1.74000 | $\nu_6$ | 37.53 |
| $r_{11}$ | 90.835 | | | | | | |
| | | $d_{11}$ | 33.442 | | | | |
| $r_{12}$ | −53.609 | | | | | | |
| | | $d_{12}$ | 5.634 | $N_7$ | 1.75520 | $\nu_7$ | 27.51 |
| $r_{13}$ | 338.641 | | | | | | |
| | | $d_{13}$ | 18.310 | $N_8$ | 1.72000 | $\nu_8$ | 52.14 |
| $r_{14}$ | −105.234 | | | | | | |
| | | $d_{14}$ | 0.845 | | | | |
| $r_{15}$ | −7252.156 | | | | | | |
| | | $d_{15}$ | 10.704 | $N_9$ | 1.72000 | $\nu_9$ | 52.14 |
| $r_{16}$ | −133.792 | | | | | | |
| | | $d_{16}$ | 0.845 | | | | |
| $r_{17}$* | −507.797 | | | | | | |
| | | $d_{17}$ | 16.901 | $N_{10}$ | 1.72000 | $\nu_{10}$ | 52.14 |
| $r_{18}$ | −97.502 | | | | | | |

Aspheric coefficients ($r_{17}$):
$A_4 = 0.32795 \times 10^{-6}$   $A_6 = 0.10126 \times 10^{-10}$
$A_8 = 0.13405 \times 10^{-14}$ wherein, the asterisk (*) represents the aspheric surface, and the apsheric coefficients $A_1$, $A_2$, - - - are defined by the following equation;

$$X = A_0Y^2/\{1 + (1 - A_0^2Y^2)^{\frac{1}{2}}\} + \sum_{i=1}^{n} A_iY^i$$

wherein $A_0$ represents the paraxial radius of curvature of the basic spheric surface, X represents the coordinate along the optical surface measured from the top of the basic surface, and Y represents the coordinate perpendicular to the optical axis measured from the optical axis.

8. An inverted-telephoto type wide angle lens system comprising, from the object side to the image side:
   a first lens group of a negative refractive power, consisting of, a first lens component of a negative refractive power, a second lens component of a negative refractive power, and a third lens component of a positive refractive power;
   a second lens group of a positive refractive power, consisting of, a fourth lens component of a positive refractive power, a fifth lens component of a negative refractive power containing a single lens element or compound lens element; and
   a third lens group of a positive refractive power, consisting of, a sixth lens component of a negative compound lens element, a seventh lens component of a positive refractive power, and an eighth lens component of a positive refractive power;

wherein the second and third lens groups are shiftable to the object side along the optical axis of the lens system at different speeds from one another in a focusing operation to a closer object, while the first lens group is stationary on the optical axis in the focusing operation.

9. An inverted-telephoto type wide angle lens system as claimed in claim 8, wherein the lens system fulfills the following conditions;

$1.0 < R < 1.5$ $0.12 < L/f < 0.38$ wherein;

R represents a ratio of shifting speed between the second and third lens group in the focusing operation;

L represents an axial distance between the first and second lens group in infinity focusing condition; and f represents a compound focal length of the whole lens system.

10. An inverted-telephoto type wide angle lens system as claimed in claim 9, wherein the lens fulfills the following conditions;

$0.1 < f/-f_1 < 0.35$ $1.5 < -f_1/f_2 < 3.5$ $2.1 < -f_1/f_3 < 5.0$ wherein;

$f_1$ represents a focal length of the first lens group;

$f_2$ represents a focal length of the second lens group; and $f_3$ represents a focal length of the third lens group.

* * * * *